Dec. 7, 1965   C. H. WICKENBERG   3,221,638
ROTISSERIE
Filed May 25, 1964   3 Sheets-Sheet 1
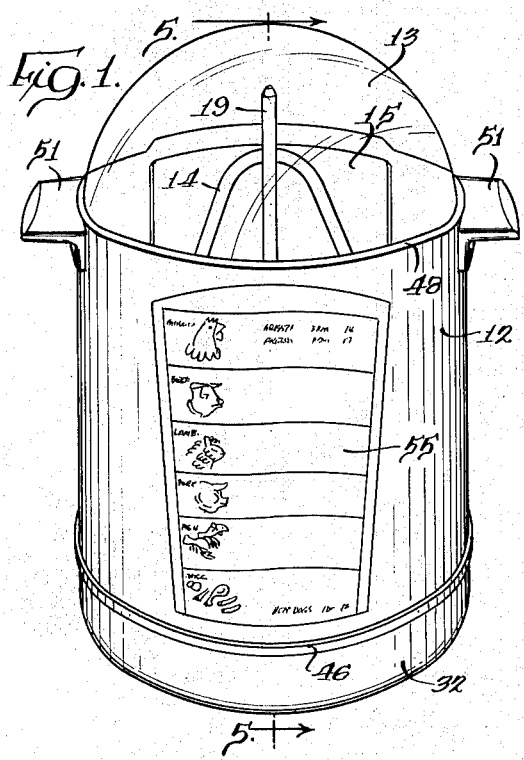
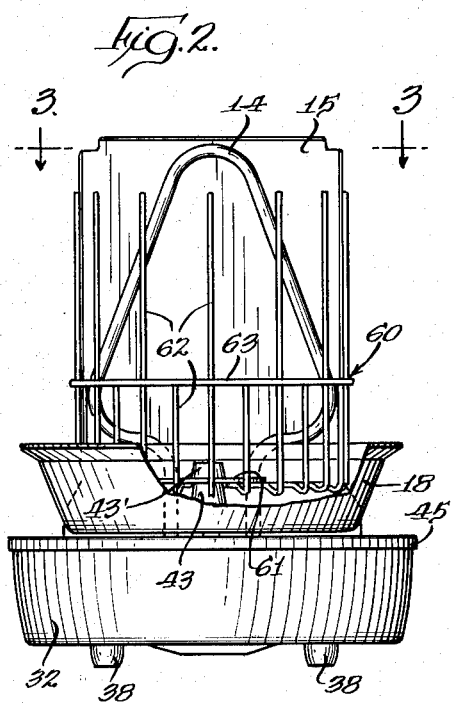
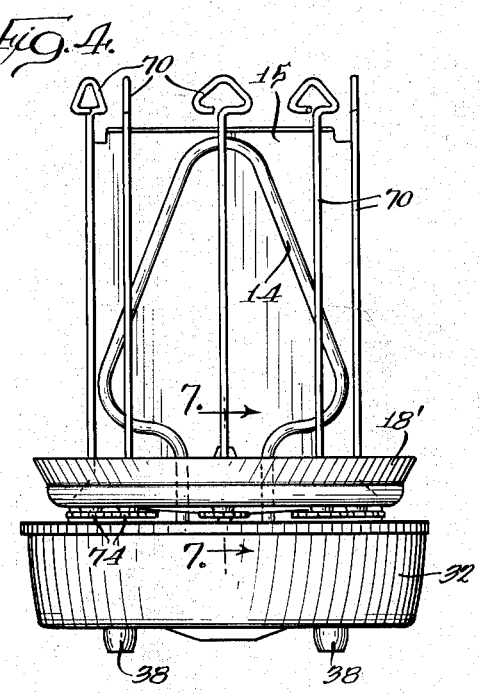
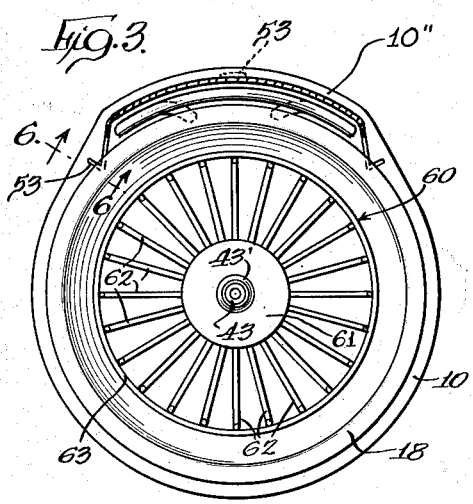
INVENTOR.
Chester H. Wickenberg
BY
George R. Clark
Atty

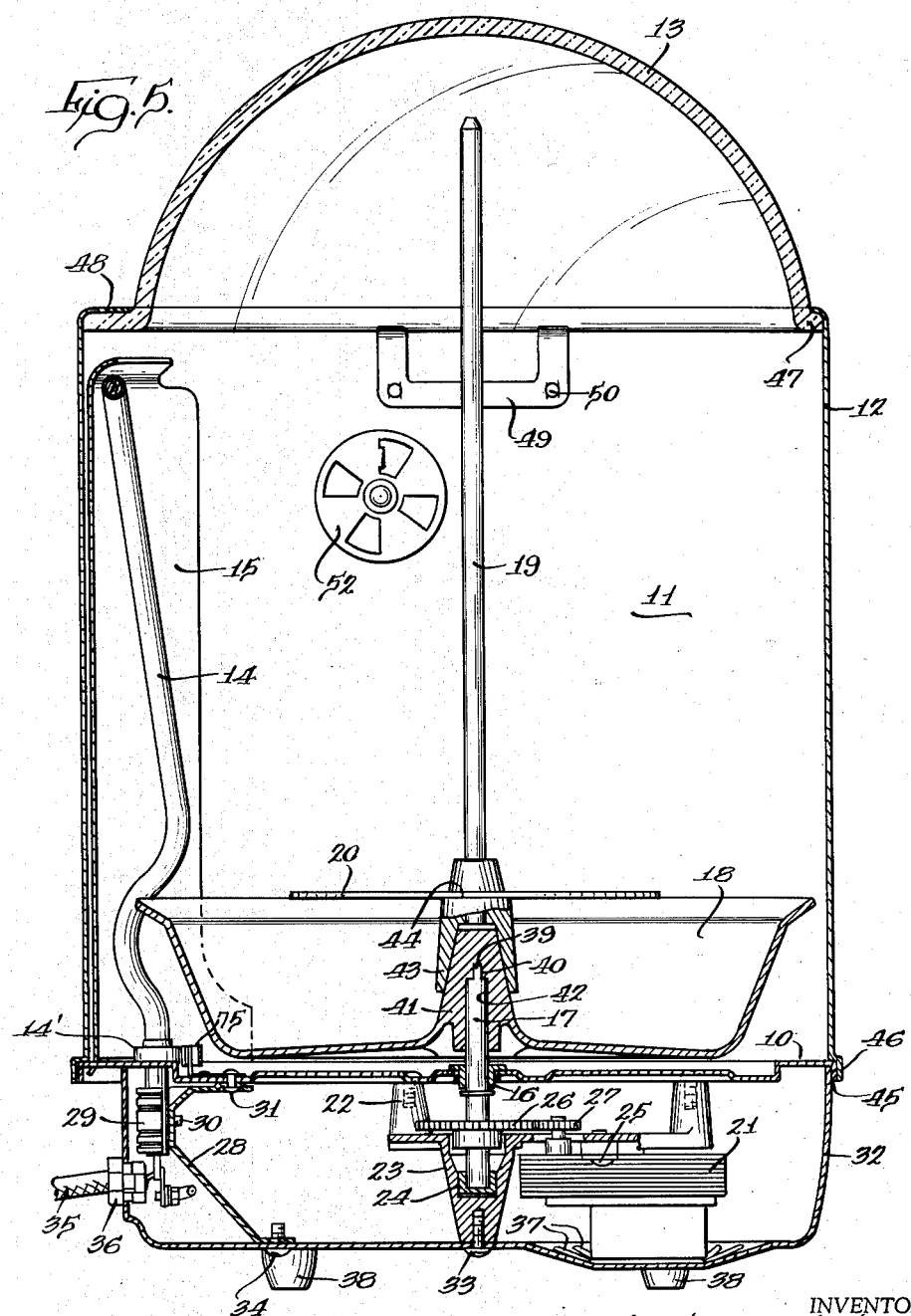

Dec. 7, 1965   C. H. WICKENBERG   3,221,638
ROTISSERIE
Filed May 25, 1964   3 Sheets-Sheet 3
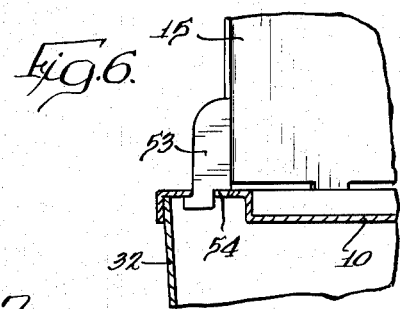
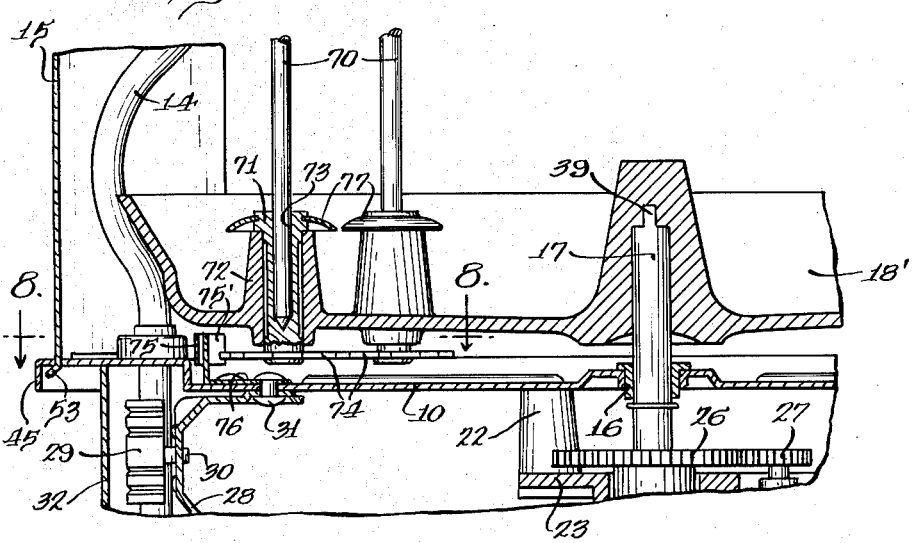
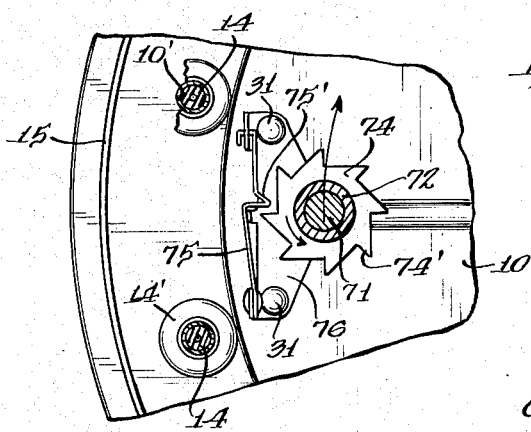
INVENTOR.
Chester H. Wickenberg
BY
George R. Clark
Atty

United States Patent Office 3,221,638
Patented Dec. 7, 1965

3,221,638
ROTISSERIE
Chester H. Wickenberg, Elgin, Ill., assignor to Sunbeam Corporation, Chicago, Ill., a corporation of Illinois
Filed May 25, 1964, Ser. No. 370,016
1 Claim. (Cl. 99—340)

This invention relates to a portable electric rotisserie, and more particularly, to an improved portable electric rotisserie which can be used to cook many different foods.

It is an object of the invention to provide a low-cost readily assembled and versatile portable electric rotisserie.

The invention will be best understood by considering the following description taken in connection with the accompanying drawings, and its scope will be pointed out in the appended claims.

In the drawings, FIG. 1 is a perspective view of a rotisserie embodying the invention;

FIG. 2 is a front elevational view of the rotisserie with the cover removed and the trivet attachment in place;

FIG. 3 is a sectional view taken along the section line 3—3 of FIG. 2;

FIG. 4 is a front elevational view similar to that of FIG. 2, but with the shish-kabob attachment in place;

FIG. 5 is an enlarged sectional view taken along the section line 5—5 of FIG. 1;

FIG. 6 is an enlarged sectional view taken along the section line 6—6 of FIG. 3;

FIG. 7 is an enlarged sectional view taken along the section line 7—7 of FIG. 4; and FIG. 8 is a sectional view taken along the section line 8—8 of FIG. 7.

Referring first to FIGS. 1 and 5 of the drawings, the rotisserie is illustrated therein with its first form of attachment. The rotisserie comprises a generally circular shaped and horizontal positioned plate 10. A cooking chamber 11 is defined above plate 10 by a generally cylindrical shaped and vertically disposed member 12 The upper end of member 12 is closed by a glass or other transparent material cover 13. A sheathed electrical heater 14 is positioned along one side of the chamber 11. Heater 14 is generally U-shaped, vertically disposed and inverted. Disposed between heater 14 and the adjacent side wall of the member 12 is a reflector heat guard 15.

A bearing 16 is provided in an aperture formed in the central portion of plate 10. A short spindle 17 which is vertically disposed extends through the bearing 16. Mounted on spindle 17 is a pan 18, and mounted on the pan 18 is a spit 19. A chicken, roast or the like can be positioned on spit 19. A plate 20 located on spit 19 keeps the meat from sliding on the spit 19 into the bottom of the pan. A motor indicated generally by reference numeral 21 is provided beneath the plate 10 for rotating the spindle 17. As the spindle 17 rotates it will carry the parts 18-20 around with it whereby the foodstuffs on spit 19 are rotated past the heater 14 for uniform cooking.

Connected to the underside of plate 10 by a plurality of studs 22 or the like is a motor support frame 23. The frame 23 provides a bearing 24 for the lower end of spindle 17 and supports the motor 21. The motor 21 is mounted on frame 23 by a plurality of studs or the like 25.

The motor 21 drives spindle 17 through a pair of gears 26 and 27. Gear 26 is mounted on spindle 17 whereas gear 27 is part of the motor assembly. These two gears are in mesh with each other whereby the motor turns the spindle at a low rate of speed.

Connected to the underside of plate 10 along the periphery thereof is a heater clamp comprising members 28 and 29. The two members 28 and 29 are urged towards each other by clamping bolts or the like 30. The clamp is supported off plate 10 by a plurality of rivets or the like 31 connecting the upper end of member 28 to plate 10. A pair of apertures 101 are formed in plate 10 immediately above and in alignment with the clamp comprising parts 28 and 29. The lower ends of the inverted heater 14 extend through the apertures 101 into the clamp. Therefore, heater 14 is supported by plate 10. A pair of seal members 14' are provided about the ends of heater 14 at the place where they pass through plate 10 to prevent food particles or meat juices from working their way to below plate 10.

A generally cup-shaped horizontally disposed member 32 is provided beneath the plate 10. The member 32 serves as a housing for the parts mounted on the underside of plate 10 such as the lower end of spindle 17, the motor 21, the gear train 27, 26 between the motor and spindle, the motor supporting frame 23, and the heater clamp comprising parts 28 and 29 as well as the lower ends of the heater 14. The member 32 is retained in assembled position by means such as a stud 33 passing through member 32 into the motor support frame 23, and another stud 34 passing through member 32 into the lower end of clamp part 28. An electrical connector cord 35 extends through an aperture formed in one side of member 32 which is provided with a strain relief 36. The electrical connector cord 35 is connected to the heater 14 and motor 21 inside member 32 in a manner which will be obvious to those skilled in the art.

A plurality of vents 37 are formed in the bottom of member 32 adjacent to the motor 21 for cooling the same. Also, supporting feet or lugs 38 are formed on the underside of member 32. The spindle 17 and pan 18 are connected in drive relationship by virtue of a key 39 formed on the upper end of spindle 17 and a slot 40 formed in the pan 18. The center of pan 18 is provided with a raised boss 41 which has a blind bore 42 formed in the bottom thereof. The blind bore 42 receives spindle 17. The slot 40 is formed at the end of blind bore 42 and receives the key 39 formed at the upper end of spindle 17.

For purposes of connecting the pan 18 and spit 19 together in drive relationship the exterior of boss 41 is tapered. Connected to the lower end of spit 19 is a cone-shaped member 43. When the cone-shaped member 43 is seated on the tapered boss 41 these two parts are in drive relationship by virtue of the friction fit between these two parts. The plate 20 is provided with a central aperture and when plate 20 is mounted on spit 19 the plate 20 rests on a ledge 44 formed at the upper end of the cone-shaped member 43.

The upper edge of cup-shaped member 32 is received by a peripheral flange 45 formed on the plate 10. The lower end of cylindrical member 12 has a flange 46 formed thereon which is seated on the flange 45 of plate 10. The glass cover 13 has a peripheral flange 47. Flange 47 is seated in a flange 48 formed at the upper end of cylinder 12. Flange 47 is retained seated in flange 48 by brackets or the like 49 connected to the side of cylinder 12 by means such as studs 50. The studs 50 also serve to connect a pair of thermal insulating material handles 51 to opposite sides of cylinder 12. Adjustable vent means 52 are provided along the upper end of cylinder 12. However, otherwise the cooking chamber 11 is essentially sealed closed.

As foodstuffs positioned on spit 19 rotate past heater 14 they are cooked by the radiant energy of heater 14. Additionally, the radiant energy of heater 14 is reflected off the side walls of cylinder 12 on to all portions of the meat. That is to say, cylinder 12 is constructed from metal which will provide an inner reflecting surface. The heat reflector 15 is primarily a guard to prevent kitchen wall surfaces or the like positioned adjacent to heater 14 from becoming scorched or the like. For example, the heater 14 may be energized during the time that cylinder 12 is removed to load meats on the spindle 19. In the absence of guard 15 the heater 14 might damage kitchen wall surfaces or the like should the heater 14 be positioned in close proximity thereto. The heater guard 15 is removably connected to the plate 10 so that it can be detached for purposes of cleaning. The connecting means is best illustrated in FIG. 6. At the lower end and opposite sides of guard 15 tabs 53 are provided. These tabs will fit into notches 54 provided in the plate 10. The guard 15 is constructed from thin sheet metal so that it can be bent slightly to facilitate insertion and removal of tabs 53 with respect to notches 54.

The pan 18 is provided for catching juice drippings from meats and the like being broiled by the rotisserie. However, the broiled meats will not become dry during the cooking process but will be juicy when done. This is because the heating chamber 11 is essentially sealed closed so that the cooking vapors are retained in chamber 11 whereby it does not become dry. Also, since the meats are vertically disposed, the juices will run down along the meat on spit 19. Additionally, inasmuch as the heating chamber 11 is closed the device is thermally efficient. This is because heat is not lost from inside the cooking chamber 11 to the atmosphere. Furthermore, a sealed cooking chamber provides the advantage of essentially odorless cooking. A cooking chart 55 is provided on the outside of cylinder 12 to provide a guide for the various foodstuffs which can be prepared with the rotisserie.

The second form of attachment provided for the rotisserie is illustrated in FIGS. 2 and 3. The attachment comprises a trivet 60 which is shaped into the form of a basket. The trivet or basket 60 is used for cooking chunks of meat, warming buns or rolls, baking potatoes, and the like. The trivet or basket 60 can be positioned on the spit 19. However, the spit 19 is intended for larger pieces of meat. Therefore, ordinarily it and its plate 20 are removed and then basket 60 is positioned on the tapered boss 41 of pan 18. Basket 60 is provided with a centrally apertured bottom plate 61 which has an integral cone-shaped portion 43' similar in function to that of the cone 43 of the first form of attachment. Extending from the plate 61 are radiating wires or the like 62 which are then turned in a vertical direction. At their inner ends the wires 62 are connected to plate 61 by welding or the like. About half way up the basket 60 a wire reinforcing ring 63 is provided. Ring 63 is connected to wires 62 by welding or the like. Alternate wires 62 are cut off at the ring 63. Chunks of meat can be positioned in the bottom of basket 60 and can also be speared on to the upper ends of the wires 62 which extend above the ring 63.

By viewing the top of FIG. 3 it will be noted that the plate 10 is not a true circle but has an enlargement 10" along one side thereof to provide space for the heater 14 and guard 15. A similar enlargement is also present in the member 12. Therefore, member 12 does not have a true cylindrical shape. However, utilizing this configuration in the rotisserie makes it possible to obtain a large sized cooking chamber 11 without unnecessarily increasing the external dimensions of the rotisserie.

The third form of attachment for the rotisserie, namely a shish-kabob attachment, will now be described by reference to FIGS. 4, 7 and 8. In this form of the invention the pan 18 is replaced by a pan 18' which is provided with means for carrying a plurality of vertically disposed rotary spits along its periphery. The spits are mounted in rotary carriers 71 which are positioned in apertured bosses 72 formed along the periphery of pan 18'. The carriers 71 have blind bores 73 which are adapted to receive the lower pointed ends of spit 70. Connected to the lower ends of the rotary carriers 71 and positioned between the pan 18' and the plate 10 are a plurality of ratchet wheels 74. These ratchet wheels 74 are successively rotated a portion of a turn by a resilient finger 75 mounted on plate 10. Resilient finger 75 is carried by a mounting bracket 76 which is connected to plate 10 by the rivets 31. Finger 75 is disposed between plate 10 and pan 18' and in the path of travel of the ratchet wheels 74 as pan 18' rotates. The resilient finger 75 has an integral ratchet tooth engaging portion 75'. The portion 75' successively engages one of the teeth 74' of the ratchet wheels 74. In this manner the spits 70 are rotated as the pan 18' rotates. Therefore, foodstuffs on the spits 70 have all of their sides exposed directly to the radiant energy of heater 14. The upper ends of the blind bored rotary spit carriers 71 have convex-shaped guards 77 connected thereto. The guards 77 are for the purpose of keeping the carriers 71 and bosses 72 and their bearing surfaces clean. The bosses 72 are equidistantly spaced from each other and equidistantly radially spaced from the spindle 17 for good balance. The spits 70 are removable from carriers 71 and if less than all the spits are loaded with foods then they are symmetrically loaded so as to obtain good balance.

While there have been shown and described particular embodiments of the invention, it will be obvious to those skilled in the art that changes and modifications may be made without departing from the invention, and that it is intended by the appended claim to cover all such changes and modifications as fall within the true spirit and scope of the invention.

What is claimed as new and desired to be secured by Letters Patent of the United States is:

A rotisserie comprising a generally circular shaped base plate, a bearing formed in the central portion of said plate, a vertically disposed spindle in said bearing, a motor support frame connected to the underside of said plate, a bearing formed in said frame for the lower end of said spindle, a motor supported on said frame for driving said spindle, a vertically disposed sheathed electrical heater positioned along the periphery of said plate, said heater being generally U-shaped and inverted, a heater support clamp connected to the underside of said plate, a pair of apertures formed in said plate in alignment with said clamp, the ends of said heater extending through said apertures into said clamp, a support for said plate comprising a generally cup-shaped member disposed beneath said plate for housing said frame, motor and clamp, a vertically disposed curved heater reflector positioned on said plate radially outward of said heater, a generally cyindrical shaped and vertically disposed metallic cooking chamber defining member positioned on said plate, said heater and reflector being positioned inside said cooking chamber defining member, and a transparent material cover member for the upper end of said cooking chamber defining member.

References Cited by the Examiner

UNITED STATES PATENTS

| | | | |
|---|---|---|---|
| 1,819,301 | 8/1931 | Noble | 99—421 |
| 2,262,498 | 11/1941 | Holm-Hansen | 99—341 |
| 2,324,233 | 7/1943 | Parsons | 99—421 |
| 2,377,873 | 6/1945 | Finizie | 99—421 |
| 2,482,601 | 9/1949 | Spartalis | 99—421 |
| 2,558,294 | 6/1951 | Finizie | 99—341 |
| 2,565,786 | 8/1951 | Spartalis | 99—421 |
| 2,591,072 | 4/1952 | Hughes | 99—427 |
| 2,682,599 | 6/1954 | Smith | 219—402 |
| 2,696,163 | 12/1954 | Galley | 99—421 |
| 2,814,982 | 12/1957 | Labin | 99—427 |
| 2,984,730 | 5/1961 | Ostrom et al. | 99—404 |

FOREIGN PATENTS 1,264,679  5/1961  France.

CHARLES A. WILLMUTH, *Primary Examiner.*

ROBERT E. PULFREY, *Examiner.*